J. VAN HORNE.
Grain Meter.
No. 25,458.
Patented Sept. 13, 1859.
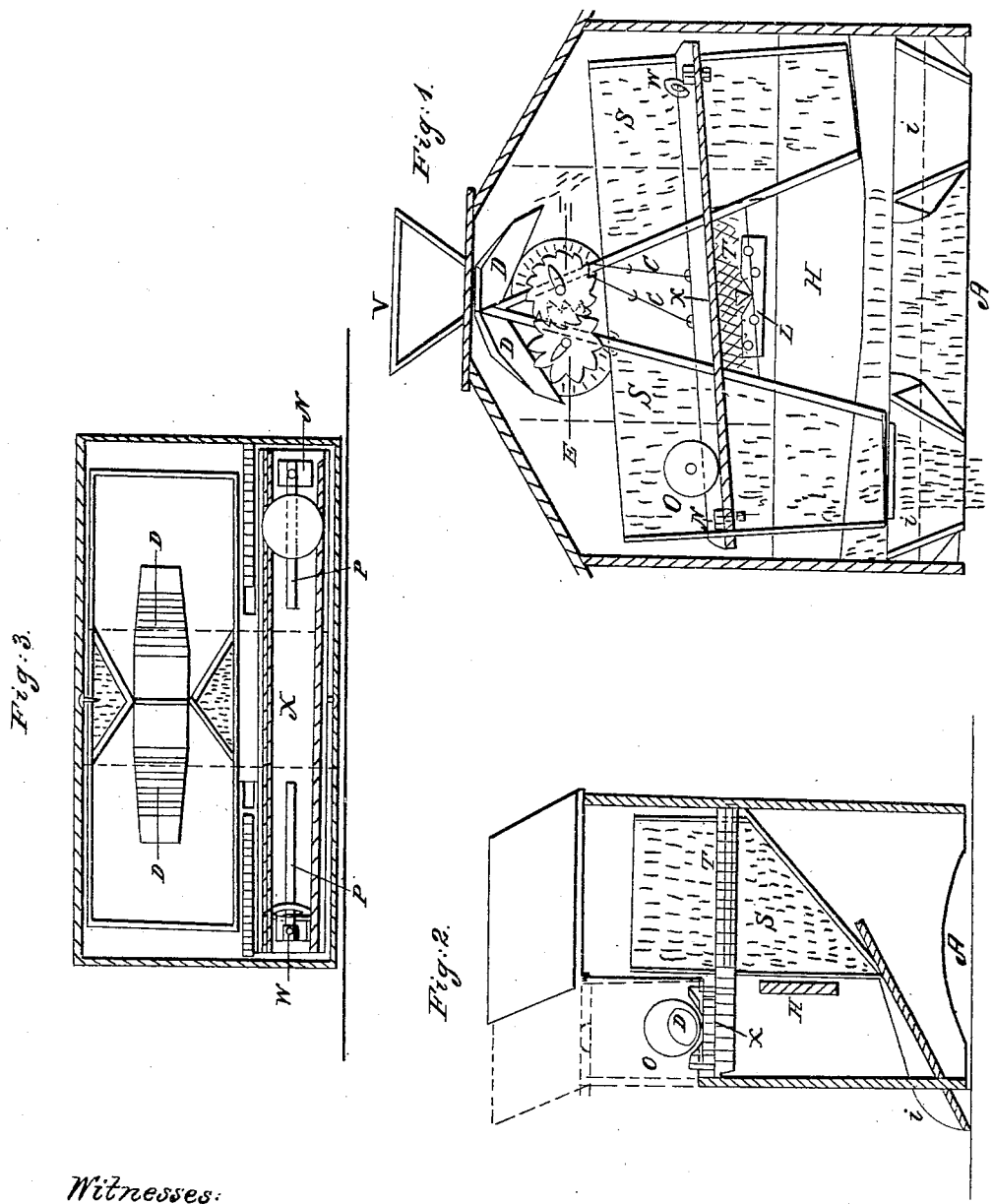
Witnesses:
Jacob mennmkel
L. C. Norrell
Inventor:
John Van Horne

UNITED STATES PATENT OFFICE.

JOHN VAN HORNE, OF MAGNOLIA, ILLINOIS.

MACHINE FOR WEIGHING GRAIN, &c.

Specification of Letters Patent No. 25,458, dated September 13, 1859.

*To all whom it may concern:*

Be it known that I, JOHN VAN HORNE, of Magnolia, in the county of Putnam and State of Illinois, have invented a new and useful machine for weighing and dividing grain in equal and unequal quantities at the same time from a steady stream of grain running into the weigher or divider, at the same time tallying and registering the amount of pounds or bushels as the grain passes through it; and I do hereby declare that the following is a full, clear, and exact description of the same, reference being had to the annexed drawings, making a part of this specification, in which—

Figure 1 is a perspective view; Fig. 2 is an end view; Fig. 3 is a top view.

The nature of my invention consists in using a round ball for a weight, in connection with two hoppers which are secured to a block of wood with centers, or pivots at each end resting in notches, in plates on the inside of box, or machine, a balance beam or railway rests on the block of wood transversely, this balance beam is concave nearly the entire length, with blocks at each end with spiral springs attached. These blocks are made to shift from the outer ends of the balance to and from the center so as to shorten or lengthen the lever as may be required in weighing, which process is carried on by means of the ball, or round weight, rolling from one end to the other, as produced by the preponderating weight of grain.

The machine is made with a hopper at the top for the purpose of receiving the grain to be weighed. From this hopper the grain runs into a spout (either the right or left one) opposite the end of the lever or beam the ball or weight rests on. From this spout the grain runs into a hopper in the same direction from the ball or weight. After this hopper has the required amount of grain to turn the beam on its pivot it descends by its gravity, at the same time the ball, or round weight, rolls to the other end of the railway or beam, while the hopper that has descended is down, it having passed by an opening, it is discharging its grain; its descending having brought the other spout opposite the hopper at the top of the machine, the other hopper receives its grain until it receives its amount, it then descends and discharges and so on alternately until the grain is weighed out. There is also a registering apparatus attached to the beam by means of two wires on each side of the center of the beam connected with cog wheels, which talleys or registers the weights or drafts.

To enable others skilled in the art to make and use my invention I will proceed to describe its construction and operation.

I construct a box A¹ out of boards, or timbers, in the form as shown in Figs. 1 and 2 in which I place a block or timber T, which has a center, or pivot, at each end that rests on plates L L with notches in for the centers or pivot to rock in on one end of said block T.

I construct two hoppers " S S " the bottoms of which are an inclined plane at an angle of forty-five degrees so that the grain will discharge itself; on the opposite end of the block, or timber, I secure a scale beam, or railway " X " in which I place a perfectly round ball or weight " O " in the bottom of the scale beam or railway which is concave—there are grooves " P P " for bolts, with blocks and spiral springs " N N " attached to slide in, to and from, the center or pivot of the beam—above, and attached to the hoppers are two spouts " D D " or one spout with a division, so that every time the left hand hopper is down this division is to the left of the supply or main hopper V and the right hopper is filling, and so the reverse with the right hand hopper.

Board " H " runs lengthwise of the box A¹ and closes the opening of both hoppers " S S " when either hopper is empty. When the hopper is filled with the required amount of grain it descends so the opening is below board H and by that means the grain is discharged, when it is empty it returns so, as said before, board H forms one side of the hopper where there is an opening so it retains the grain until the hopper has the required amount to turn the scale.

" I I " are spouts to receive the grain from the hoppers which are so placed at such an angle as to permit the grain to be discharged from the weigher.

Wires " c c " are attached to the beam on each side of the center of beam " X " and connected with cog wheels or sag wheels E and F by which means the amount of drafts or weights are registered.

What I claim as my invention and desire to secure by Letters Patent is—

Weighing by means of a round ball or self acting weight "O" operating in a concave beam, or balance, and blocks and spiral springs "N N" working in the bottom of the beam, by means of the grooves "P P" so as to weigh different weights or drafts, and board "H" combined for the purposes set forth as herein above described.

JOHN VAN HORNE.

Witnesses:
ROBERT IRWIN,
J. T. THORNTON.